United States Patent [19]

Griebel

[11] 3,980,941
[45] Sept. 14, 1976

[54] RESET CIRCUIT FOR AUTO-SEQUENTIAL COMMUTATED INVERTER

[75] Inventor: Ronald F. Griebel, Erie, Pa.
[73] Assignee: General Electric Company, Erie, Pa.
[22] Filed: June 18, 1975
[21] Appl. No.: 587,975

[52] U.S. Cl. .............................. 321/45 R
[51] Int. Cl.² .............................. H02M 7/515
[58] Field of Search ............... 321/5, 45 C, 45 ER

[56] References Cited
UNITED STATES PATENTS

| | | | |
|---|---|---|---|
| 3,733,543 | 5/1973 | Rettig | 321/45 C X |
| 3,887,859 | 6/1975 | Hubner | 321/5 |

FOREIGN PATENTS OR APPLICATIONS

| | | | |
|---|---|---|---|
| 26,771 | 1/1965 | Japan | 321/45 C |
| 41,981 | 6/1966 | Japan | 321/45 ER |

Primary Examiner—William M. Shoop
Attorney, Agent, or Firm—A. S. Richardson, Jr.

[57] ABSTRACT

An improved auto-sequential commutated controlled current inverter for driving a multi-phase load from a source of controlled magnitude direct current is disclosed. The auto-sequential commutated inverter comprises a plurality of parallel connected branch sub-circuits with each branch sub-circuit comprising at least one gate controlled power thyristor device connected in series circuit relationship with a respective power diode. The branch sub-circuits thus comprised are connected between a respective phase input to the multi-phase load and a common direct current power supply terminal for connection to the source of controlled magnitude direct current. A respective commutating capacitor is interconnected between the junctures of the power thyristor and power diode of each respective branch sub-circuit and the power thyristor and power diode of the next adjacent branch sub-circuit. An improved reset circuit is connected to the auto-sequential commutated inverter thus constructed for improving the frequency response characteristics of the inverter, thereby, allowing it to operate at higher frequencies with minimum size power components. The improved reset circuit comprises a common impedance for assisting in the discharge of energy stored in the commutating capacitors. The common impedance has one terminal connected to the common direct current power supply terminal and the remaining terminal connected in common to corresponding terminals of a plurality of coupling diodes. There is one coupling diode for each phase of a multi-phase load being supplied with each coupling diode having one terminal connected in common with the corresponding terminals of the remaining coupling diodes to the said one terminal of the common impedance. The remaining terminals of the respective coupling diodes are connected respectively to the juncture of the power thyristor and power diode of a respective branch sub-circuit. The common impedance preferably comprises a common inductive reactance having resistance for dissipating energy stored in the common inductive reactance and further preferably comprises a discrete inductor having an inductive reactance which series resonates with the equivalent capacitance of the commutating capacitors at a higher frequency than the desired operating frequency of the inverter. The dissipating resistance may be in the form of a discrete resistor connected either in series or in parallel with the discrete inductor. Other embodiments of the reset circuit are described.

22 Claims, 20 Drawing Figures

RESET CIRCUIT FOR AUTO-SEQUENTIAL COMMUTATED INVERTER

BACKGROUND OF INVENTION

1. Field of the Invention

This invention relates to new and improved auto-sequential commutated controlled current inverters having a new and improved reset circuit. The inverters are of the type for supplying current of a controlled magnitude to a multi-phase load such as a three-phase alternating current induction motor. In such arrangements, the current inverter is switched at a desired operating frequency for the load being supplied. In the example cited, the inverter switching frequency determines the speed of rotation of the induction motor.

More specifically, the invention relates to new and improved auto-sequential commutated controlled current inverter having a new and improved reset circuit wherein the reset circuit facilitates transfer of load current from one phase of a multi-phase load to another phase through the medium of the inverter while automatically commutating off the branch of the inverter circuit which had been supplying a previously excited phase.

2. Prior Art Problem

Auto-sequential commutated controlled current inverter circuits having reset circuits have been used in the past and are presently available to the industry. The use of reset circuits with controlled current inverters of this type provides two advantageous operating features. The first advantage is that the reset circuit achieves the transfer of current flow from one phase to another in a minimum amount of time, thus allowing higher frequency operation. The second advantageous feature is that the time of transfer from one phase to another is made substantially independent of the load operating point. However, known controlled current inverter reset circuits are designed in a manner such that the commutating capacitors employed in such inverters have to accomodate not only the load current (which requirement is inherent in the design of auto-sequentialcommutated controlled current inverters) but also must withstand added voltage stresses due to the reset currents. This characeristic of known reset circuit designs results in the need for larger power rated components as well as increases in the stresses placed on such components during operation. To overcome this problem, the present inventon was devised.

SUMMARY OF INVENTION

It is therefore a primary object of the present invention to provide a new and improved auto-sequential commutated controlled current inverter having a new and improved reset circuit.

Another object of the invention is to provide such a new and improved reset circuit which diverts reset current flow away from the commutating capacitors of the auto-sequential commutated controlled current inverter in which it is used thereby avoiding the need to have such components of the inverter rated to accomodate increased voltage stresses due to reset currents during operation.

In practicing the invention, a new and improved auto-sequential commutated controlled current inverter is provided for driving a multiphase load such as a three-phase alternating current, squirrel-cage induction motor from a source of controlled magnitude direct current. The auto-sequential commutated inverter comprises a plurality of parallel connected branch sub-circuits with each branch sub-circuit comprising at least one gate controlled power thyristor device connected in series circuit relationship with a respective power diode. Each of the respective branch sub-circuits thus comprised is connected between a respective phase input to the multi-phase load and a common direct current supply terminal for connection to a source of controlled magnitude direct current. A respective commutating capacitor is interconnected between the juncture of the power thyristor and the power diode of each respective branch sub-circuit and the juncture of the power thyristor and power diode of the next adjacent branch sub-circuit. The improvement comprises a reset circuit for improving the frequency response characteristics of the auto-sequential commutated inverter with minimum size power components. The reset circuit comprises a common impedance for assisting in the discharge of energy stored in the equivalent capacitance of the commutating capacitors. The common impedance has one terminal connected to the common direct current power supply terminal and a remaining terminal connected in common to corresponding terminals of a plurality of coupling diodes. One coupling diode is provided for each phase of the multi-phase loade being supplied with each coupling diode having one terminal connected in common with the corresponding terminals of the remaining coupling diodes to the said one common terminal of the common impedance and the remaining terminal of each respective coupling diode is connected respectively to the juncture of the power thyristor and power diode of a respective branch sub-circuit. The method of connection, i.e., common diode terminal, reduces the overcharge of the commutation capacitor by causing the excess energy stored in the common impedance to be dissipated in it's associated resistance rather than causing extra charging of the commutation capacitor.

The common impedance employed in the reset circuit preferably comprises a common inductive reactance having resistance for dissipating energy stored in the common inductive reactance, and also further preferably comprises a discrete inductor having an inductive reactance which series resonates with the equivalent capacitance of the commutating capacitors at a frequency higher than the operating frequency of the inverter. To provide the desired energy dissipating resistance, a discrete resistor is connected in circuit relationship with the common discrete inductor, and may be connected in either series circuit relationship or in parallel circuit relationship with the discrete inductor. Other variations of the form of the novel reset circuit which possess the above noted common features, are described in the claims. Additionally, the preferred embodiment of the invention provides for full wave excitation of a multiphase load and accordingly employs branch sub-circuits which have first and second (upper and lower) sets of power thyristors and power diodes, each having its own respective, first and second reset circuit.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein;

FIGS. 13 A through FIGS. 13 H illustrate modified forms of a novel reset circuit which is employed in the overall improved auto-sequential commutated controlled current inverter shown in FIG. 1.

DETAILED DESCRIPTION OF PREFERRED EMBODIMENT

Figure 1:
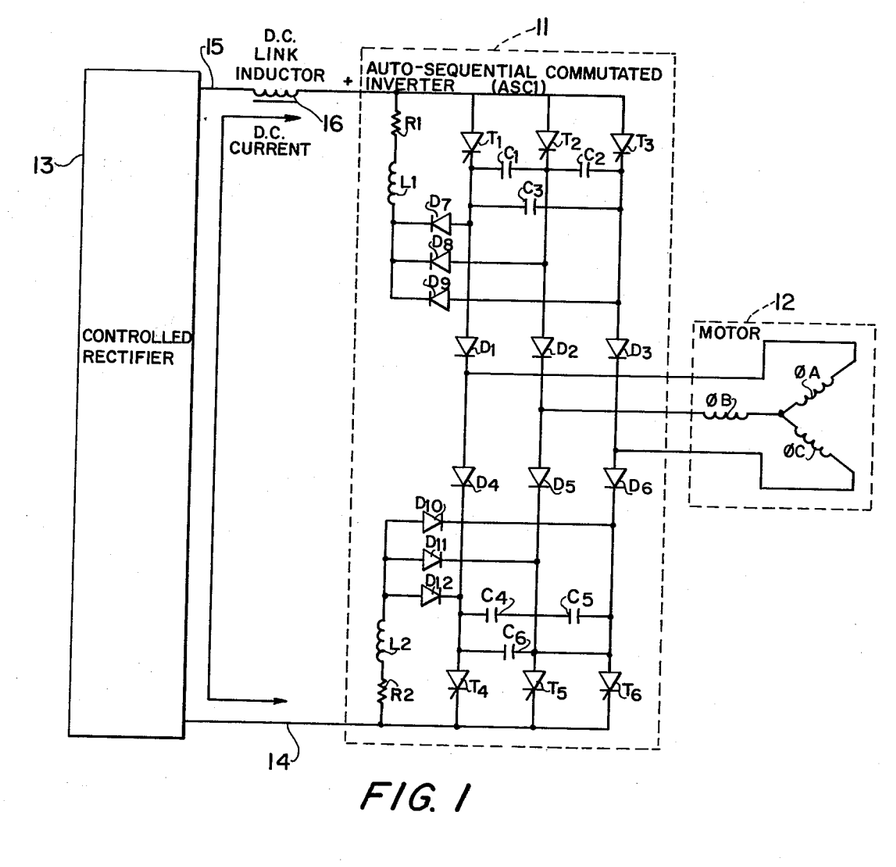
FIG. 1 is a schematic circuit diagram illustrating the construction of a new and improved auto-sequential commutated controlled current inverter having a novel reset circuit constructed in accordance with the invention.

FIG. 1 is a partial schematic circuit diagram illustrating the details of construction of a new and improved auto-sequential commutated controlled inverter having an improved reset circuit according to the invention. The basic elements or components of the auto-sequential commutated controlled current inverter are illustrated within the dotted outline box 11. The auto-sequential commutated inverter is connected to excite the separate phase inputs of a multi-phase load 12 which for example may comprise a three-phase, alternating current squirrel cage induction motor of conventional design. Controlled magnitude direct current excitation power is supplied to the auto-sequential commutated inverter 11 from a phase controlled rectifier 13 having its output connected through supply terminals 14 and 15 to the input terminals of the auto-sequential commutated inverter 11. A direct current link inductor 16 is connected in the supply terminal 15 for isolating the inverter 11 from the phase controlled rectifier 13 at the normal operating frequencies of these two sub-systems. The controlled rectifier 13 may conprise any suitable known form of phase controlled rectifier for supplying a controllable magnitude direct current through the power supply terminals 14 and 15 to the input of the auto-sequential commutated inverter 11.

The auto-sequential commutated controlled current inverter 11 is comprised by a plurality of parallel connected branch sub-circuits which are connected across the direct power supply terminals 15 and 14. Each branch sub-circuit is comprised by at least one gate controlled power thyristor device such at $T_1$ connected in series circuit relationship with a respective power diode such as $D_1$. The preferred embodiment of the invention shown in FIG. 1 forms a full wave supply for the induction motor load 12, and for this reason, each branch sub-circuit includes not only a first (upper) power thyristor $T_1$ and first (upper) power diode $D_1$, but also includes a second (lower) series connected power thyristor $T_4$ and second (lower) power diode $D_4$. All of the elements of the branch sub-circuit comprised by power thyristor $T_1$, power diode $D_1$, power diode $D_4$, and power thyristor $T_4$ are connected in series circuit current aiding relationship wherein the cathode of $T_1$ is connected to the anode of $D_1$, the cathode of $D_1$ is connected to the anode of $D_4$, the cathode of $D_4$ is connected to the anode of $T_4$, the anode of $T_1$ is connected to direct current power supply terminal 15 and the cathode of $T_4$ is connected to the power supply terminal 14. The power supply terminal 15 is considered the positive terminal tne the power supply terminal 14 as the negative terminal as indicated by the ($\pm$) polarity signs.

In addition to the branch sub-circuit comprised by $T_1$, $D_1$, $D_4$, and $T_4$, the auto-sequential commutated inverter 11 is further comprised by a branch sub-circuit formed by a first power thyristor $T_2$, a first power diode $D_2$, a second power diode $D_5$ and a second power thyristor $T_5$, connected in series circuit relationship in the order named in the same manner as described above with relation to the components of the first mentioned branch sub-circuit. A further branch sub-circuit comprised by $T_3$, $D_3$, $D_6$, and $T_6$ is constructed in a similar fashion.

It should be noted at this point that there is a separate branch sub-circuit constructed in the manner described above for each phase of the multi-phase load 12 to be supplied, and that each respective branch sub-circuit is connected between a respective phase input to the multi-phase load and a common direct current power supply terminal for connection to the source of controlled magnitude direct current. For this purpose, phase A ($\phi_A$) of the three-phase alternating current squirrel cage induction motor 12 is connected to the juncture of diode $D_1$ with diode $D_4$. Phase B ($\phi_B$) is connected to the juncture of diode $D_2$ with diode $D_5$, and phase C ($\phi_C$) is connected to the juncture of diode $D_3$ with diode $D_6$.

A respective commutating capacitor $C_1$ is interconnected between the juncture of the first thyristor $T_1$ and the first diode $D_1$ of each respective branch sub-circuit and the juncture of the first thyristor $T_2$ and diode $D_2$ of the next adjacent branch sub-circuit. Similarly, a respective commutating capacitor $C_2$ is interconnected between the juncture of the first thyristor $T_2$ and the first diode $D_2$ of the respective branch sub-circuit comprised by these elements, and the juncture of the corresponding elements $T_3$ and $D_3$ of the next adjacent branch sub-circuit. Finally, a respective commutating capacitor $C_3$ is interconnected between the juncture of the first thyristor $T_3$ with the first diode $D_3$ of the branch sub-circuit comprised by these elements, and the juncture of corresponding elements $T_1$ and $D_1$ of the next adjacent branch sub-circuit. The same type of interconnections are provided between the respective commutating capacitors $C_4$, $C_5$, and $C_6$ and the respective second thyristors $T_4$, $T_5$, and $T_6$ with their respective power diodes $D_4$, $D_5$, and $D_6$.

The improvement made available by the present invention comprises first and second reset circuits comprised by a first inductive reactance $L_1$ and a second inductive reactance $L_2$, respectively. Preferably, the inductive reactance $L_1$ has a dissipating resistor $R_1$ connected in series circuit relationship with it and the inductive reactance $L_2$ has a dissipating resistor $R_2$ connected in series circuit relationship with it. The inductive reactance $L_1$ preferably comprises a discrete inductor having an inductive reactance which series resonates with the equivalent capacitance of the commutating capacitors $C_1$, $C_2$, and $C_3$, at a frequency higher than the operating frequency of the inverter. For example, $C_1$ in series with $C_2$ and $C_3$ connected in parallel relationship across $C_1$, may comprise the equivalent capacitance ($C_{eq}$). Similarly, the inductive reactance $L_2$ is comprised by a discrete inductor which is designed to series resonate with the equivalent capacitance $C_{eq}$ of the commutating capacitors $C_4$, $C_5$, and $C_6$ at a frequency higher than the operating frequency of the multiphase load comprised by induction motor 12.

The series circuit comprised by the common inductor $L_1$ and dissipating resistor $R_1$ has one terminal connected to the common power suppoy terminal 15 and its remaining terminal connected in common to the cathode electrode of a plurality of coupling diodes $D_7$, $D_8$, and $D_9$. The remaining anode electrodes of coupling diodes $D_7$, $D_8$, and $D_9$ are connected respectively to the juncture of the first power thyristor $T_1$ with power diode $D_1$, to the juncture of the first power thyristor $T_2$ with the power diode $D_2$ and to the juncture of the first power thyristor $T_3$ with the power diode $D_3$ of each respective branch sub-circuit. Similiar interconnections are provided for the common reset inductor $L_2$ and series connected dissipating resistor $R_2$ with the exception that one terminal of this series circuit is connected to the common power supply terminal 14 and the remaning terminal of the series circuit comprised by $L_2$, $R_2$, is connected in common to the anode electrodes of a plurality of coupling diodes $D_{10}$, $D_{11}$, and $D_{12}$. The remaining cathode electrodes of coupling diodes $D_{10}$, $D_{11}$, and $D_{12}$ are connected respectively to the juncture of the second power thyristor $T_6$ with the power diode $D_6$, to the juncture of the second power thyristor $T_5$ with the power diode $D_5$ and to the juncture of the second power thyristor $T_4$ with the power diode $D_4$ of each respective branch sub-circuit.

It is understood that the schematic circuit diagram of FIG. 1 illustrates in detail only the construction of the power components of the system in question. In addition to these elements, the system of FIG. 1 will include gating circuits for causing the gate controlled power thyristors $T_1$ through $T_6$ to be gated on at some predetermined instant of time during each cycle of operation of the multi-phase load 12 being supplied. The gating circuits thereafter will gate on an adjacent power thyristor to cause a conducting thyristor to be turned-off in a manner to be described more fully hereinafter. The gating circuits for supplying the requisite gating signals to the gate control electrodes of the thyristors $T_1$ through $T_6$ are conventional in construction and operation, and are not considered to be a part of this invention. For a description of suitable gating circuits, reference is made to the fifth edition of the Silicon Controlled Rectified Manual, published by the Semi-Conductor Products Department of the General Electric Company, copies of which manual can be obtained from the Semi-Conductor Products Department of the General Electric Company, Syracuse, New York.

Figure 2:
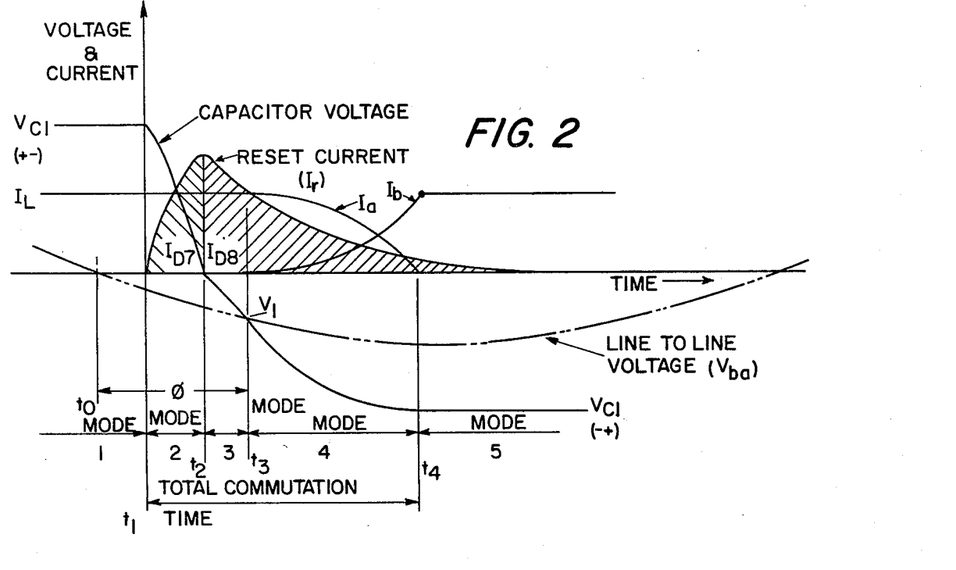
FIG. 2 is a voltage versus current wave shape characteristic curve illustrating certain of the operating characteristics of the auto-sequential commutated inverter shown in FIG. 1 during switching of current flow from one phase to another of a multi-phase load being supplied by the circuit.
Figure 3:
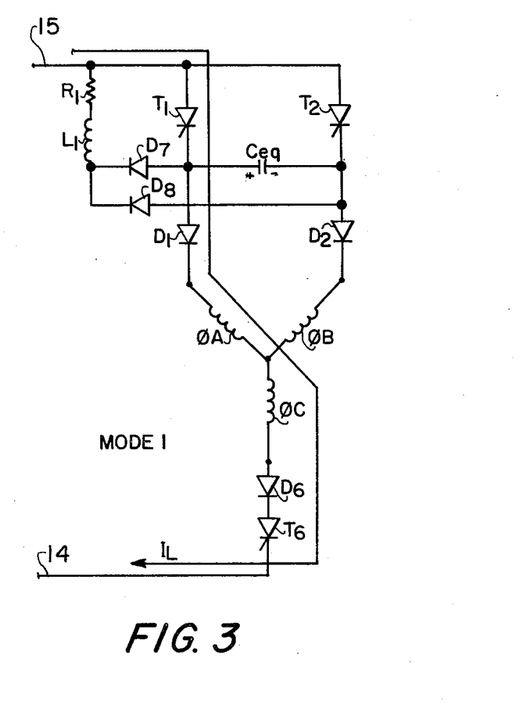
FIGS. 3 through 7 of the drawings illustrate in partial, schematic form the manner of operation of two ranch sub-circuits of the auto-sequential commutated controlled current inverter shown in FIG. 1 during the switching of load current flow from one phase to another.

Operation of the new and improved auto-sequential commutated controlled current inverter having improved reset circuit can best be explained in conjunction with FIGS. 3 through 7 of the drawings; and thereafter in conjunction with FIGS. 8 through 12 of the drawings. FIGS. 3 through 7 illustrate five different modes of operation of the circuit while switching load current flow initially from phase $\phi_A$ of the multi-phase motor load 12 to phase $\phi_B$, and thereafter switching load current flow from phase $\phi_C$ to phase $\phi_A$ as illustrated in FIGS. 8 through 12. FIG. 2 of the drawing illustrates the voltage and current wave shapes occurring across certain components of the circuit while switching load current from phase $\phi_A$ to phase $\phi_B$ as depicted in FIGS. 3 through 7.

For the purpose of this description, it is assumed that initially load current $I_L$ flows from the power supply terminal 15 through thyristor $T_1$, diode $D_1$, phase winding $\phi_A$, phase winding $\phi_C$, diode $D_6$, and thyristor $T_6$ to power supply terminal 14 and then back through the controlled magnitude direct current source. The circuit while operating in this manner, is defined as being in mode 1 operation, and, as illustrated in FIG. 2 of the drawings, occurs between times $t_0$ and $t_1$ of each operating cycle of the circuit. At his point in the operation, the gating signal source (not shown) supplies a gating-on signal to the thyristor $T_2$ causing $T_2$ to turn-on. This switches the circuit to mode 2 operation shown in FIG. 4 and occurs between the periods $t_1$ and $t_2$ shown in FIG. 2. Prior to turn-on of $T_2$ the equivalent capacitance $C_{eq}$ will be charged with the polarities indicated in FIG. 3 where, as noted before, $C_{eq}$ is comprised by commutating capacitor $C_1$ in parallel with $C_2$ and $C_3$ in series. Upon turn-on of thyristor $T_2$, load current $I_L$ transfers immediately to flow through $T_2$ in the manner shown in FIG. 4. It is noted that during mode 2, the capacitance $C_{eq}$ is included in the load current path. Simultaneously with the turn-on of $T_2$, $T_1$ will be commutated off due to the fact that the voltage of $C_{eq}$ reverses the polarity of the potential across $T_1$ causing it to turn-off auto-sequentially.

Figure 4:
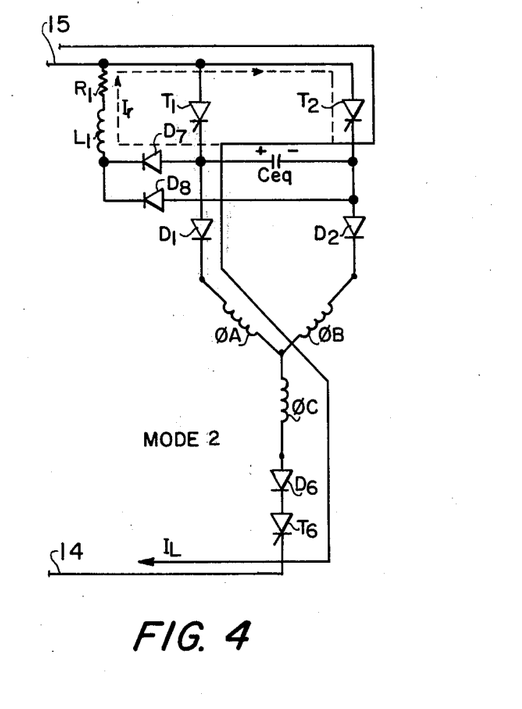
Figure 5:
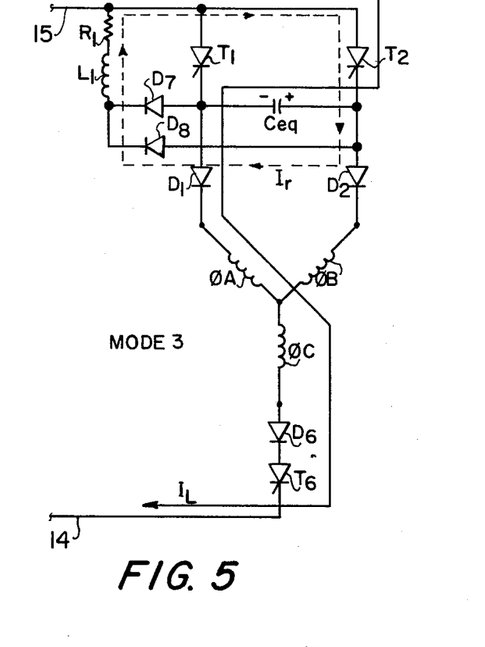

The reset current illustrated by the dotted outline path $I_r$ also flows during mode 2 of the circuit operation as shown in FIG. 4. During this mode of operation, the reset current $I_r$ will increase the discharge rate of $C_{eq}$ so as to reverse the polarity of the charge across $C_{eq}$ in the manner shown in FIG. 5 of the drawing and defined as mode 3 occurring between times $t_2$ and $t_3$ of FIG. 2. The time required to change the polarity of the charge on $C_{eq}$ from $+-$ as shown in FIG. 4, to $-+$ as shown in FIG. 5, is defined as the thyristor turn-off time of thyristor $T_1$. With out a reset circuit used with the auto-sequential commutated controlled current inverter, this turn-off time would be a direct function of the load current $I_L$, and could vary substantially over the range of values that the load current $I_L$ can assume at any given instant.

As described earlier, the common inductor $L_1$ is series resonant with $C_{eq}$ at a higher frequency than the desired operating frequency of the inverter so that the reversal of charge is achieved through diode $D_7$ in a minimum time thereby decreasing the turn-off time of thyristor $T_1$ to a minimum, and allowing the inverter to be operated at higher frequencies than is otherwise possible.

During mode 3 operation (shown in FIG. 5) the load current $I_L$ continues to flow through the path $T_2$ - $C_{eq}$ - $D_1$ - $100_A$ - $100_C$ - $D_6$ - $T_6$ and through the source to cause the voltage across $C_{eq}$ at its new polarity to equal the line to line voltage $V_{ba}$ across the phase winding $100_B$ - $100_A$. During this mode of operation, the voltage across the equivalent capacitance $C_{eq}$ will be equal to the line to line voltage $V_{ba}$ and is dependent upon the load current $I_L$. As shown in FIG. 2, this occurs between the time $t_2$ and $t_3$ and comprises only a small portion of the total commutation time for discontinuance of current flow through the $100_A$ winding (shown in FIG. 2 as time $t_1 - t_4$); hence it does not pose a serious problem. The important point to note, is that at the start of mode 3 when the polarity of the voltage across $C_{eq}$ commences to change due to load current flow $I_L$, the reset current $I_r$ transfers to the new path comprised by $L_1$, $R_1$, $T_2$, and $D_8$ from the path previously shown in FIG. 4 of the drawings including $C_{eq}$ and diode $D_7$. This is due to the fact that because of the polarity change across $C_{eq}$, and the existence of electromagnetic lines of flux around $L_1$ due to the discharge current flow through the common inductor $L_1$ during mode 2, inductor $L_1$ becomes a current source due to the collapsing lines of flux to produce the reset current flow $I_r$ shown in FIG. 5. This reset current $I_r$ does not flow through $C_{eq}$ but instead is transferred through the parallel branch path comprised by coupling diode $D_8$. This allows the energy stored in the above briefly described manner in inductor $L_1$ to be dissipated in the dissipating resistor $R_1$. This is in contrast to previously known reset circuits used with auto-sequential commutated inverters where the reset current due to the energy stored in the inductor after reversal of the polarity of charge on $C_{eq}$, flows through the equivalent capacitance $C_{eq}$ with resultant increase in the voltage stresses across $C_{eq}$. As a consequence of this characteristic of the prior art arrangement, the increased voltage stresses required that all of the components of the auto-sequential commutated inverter be fabricated from components having a higher voltage rating than otherwise is required with the circuit described in this application.

Figure 6:
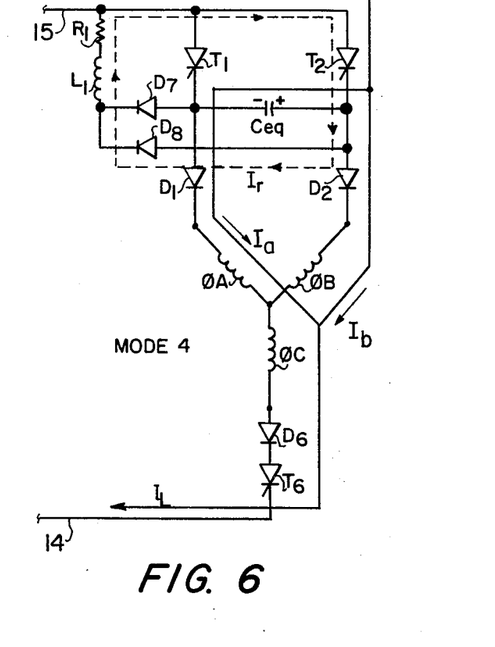

The actual transfer of load current flow $I_L$ from phase A winding to phase B winding is illustrated in FIG. 6 of the drawings which depicts the mode 4 period of operation illustrated in FIG. 2 as occurring between times $t_3$ and $t_4$. At the start of the mode 4 operation shown in FIG. 6, the voltage on $C_{eq}$ becomes equal to the voltage $V_{ba}$ appearing across windings $100_B$ and $\phi_A$. At this point in the operation, the energy stored in the two phases of the motor load must go into capacitance $C_{eq}$. As previously noted however, the reset current $I_r$ continues to flow through the path including coupling diode $D_8$ independently of the transfer of the load current flow $I_L$ from phase A to phase B winding in the manner shown in FIG. 6.

Figure 7:
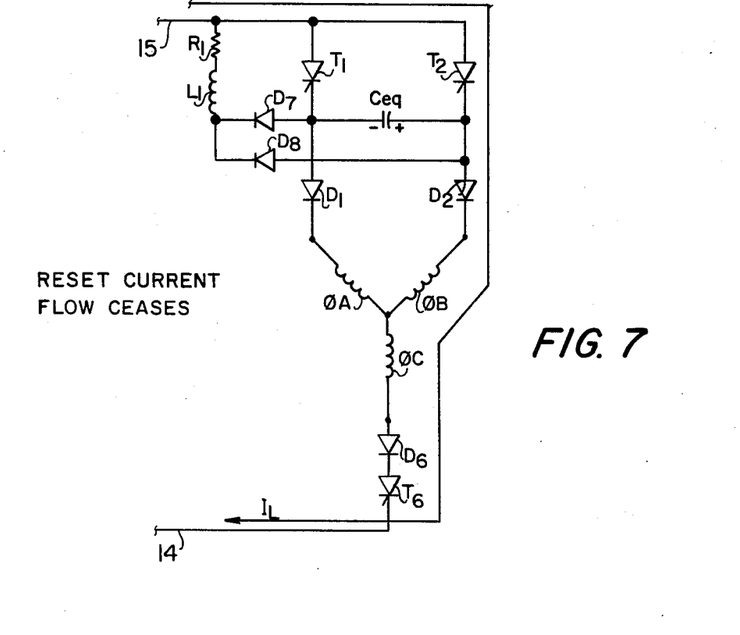

It will be noted in FIG. 6 that the polarity of voltage across $C_{eq}$ favors continued conduction through power diode $D_2$ and thus load current flow $I_L$ builds up as $I_b$ through the phase winding $100_B$. Concurrently with this building up of current $I_b$ through phase winding $100_B$, diode $D_1$ will commence to turn-off until such time that the load current flow $I_a$ stops, and load current flow is transferred completely to the phase B winding as shown in FIG. 7. This mode of operation is depicted in FIG. 2 as mode 5 commencing at time $t_4$ and continuing until the next switching operation occurs at the operating frequency of the motor load. During the mode 5 operation of the circuit, the magnitude of the voltage across $C_{eq}$ is given by the following expression:

$$V_{C_{eq}} = E_p \sin \phi + I_L \sqrt{\frac{L_{eq}}{C_{eq}}} \quad (1)$$

where $L_{eq}$ = the sum of the inductance of two phase windings $\phi_A$ and $\phi_B$. Equation (1) can be compared to the voltage requirements of the commutating capacitors used in auto-sequential commutating inverter having no reset circuit designed in the above described manner wherein:

$$V_{C_{eq}} = E_p \sin \phi + I_L \sqrt{\frac{L_{eq}}{C_{eq}}} + I_{r1} \sqrt[x]{\frac{L_r}{C_{eq}}} \quad (2)$$

and where $I_{r1}$ is the reset current flowing at time $t_3$ and $L_r$ is the inductance of the reset inductor used with the known reset circuit designs. From a comparison of equations (1) and (2) it will be seen that prior art reset circuit designs and auto-sequential commutated inverters constructed in accordance with known designs require larger rated power components than otherwise are needed with the circuit of the invention.

Figure 8:
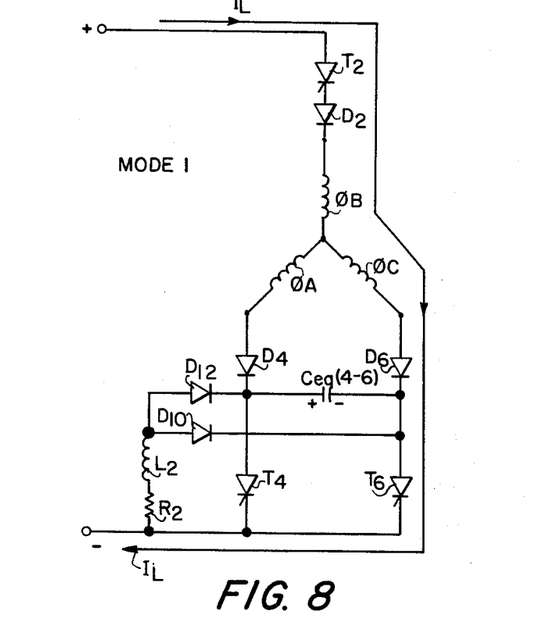
FIGS. 8 through 12 are partial schematic circuit diagrams of the circuit shown in FIG. 1, and illustrate the next sequential step in switching load current flow from one phase to another of a multi-phase load.

FIG. 8 through 12 of the drawings illustrate comparable operating modes 1 through 5 of the next switching action in sequence whereby load current flow is transferred from phase C winding as depicted in FIGS. 7 and 8 to phase A winding of motor load 12. In this switching sequence, the second or lower reset circuit comprised by the inductive reactance $L_2$ is utilized. FIG. 8 illustrates the load current flow $I_L$ for mode 1 of the inverter condition just prior to switching the inverter to cause current flow through the next phase winding $\phi_A$, and corresponds to the condition illustrated as mode 5 in FIG. 7. In the FIG. 8, mode 1 condition, load current $I_L$ flows from the controlled magnitude current source through T2, D2, phase $\phi_B$, $\phi_C$, $D_6$, $T_6$, back to the current source. From a comparison to FIG. 7, it will be seen that the load current path $I_L$ is the same for both FIGS.

Figure 9:
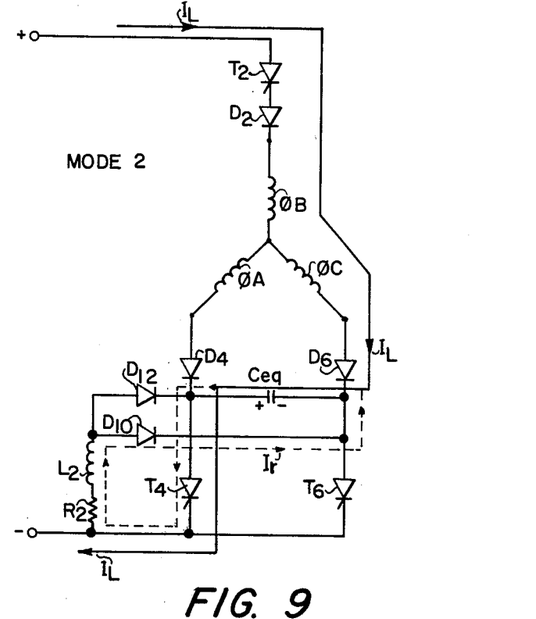
Figure 10:
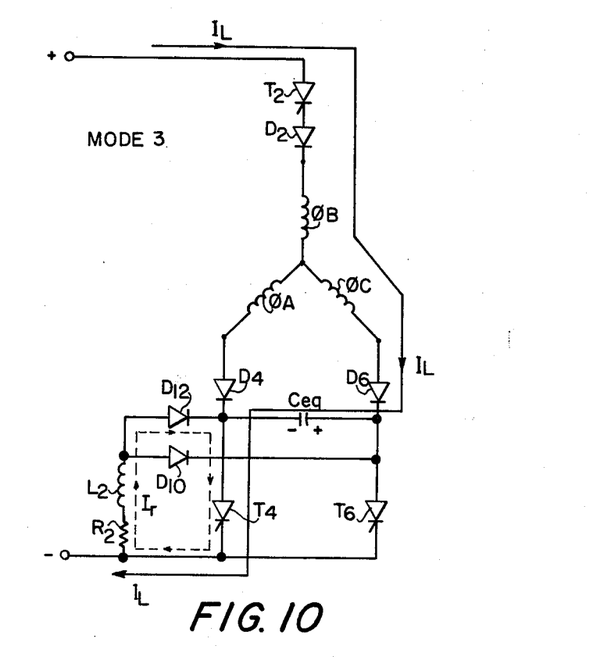
Figure 11:
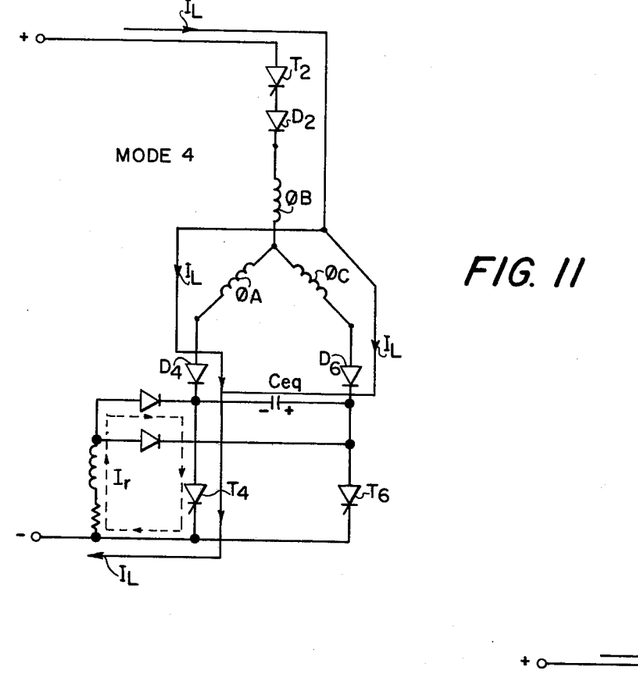
Figure 12:
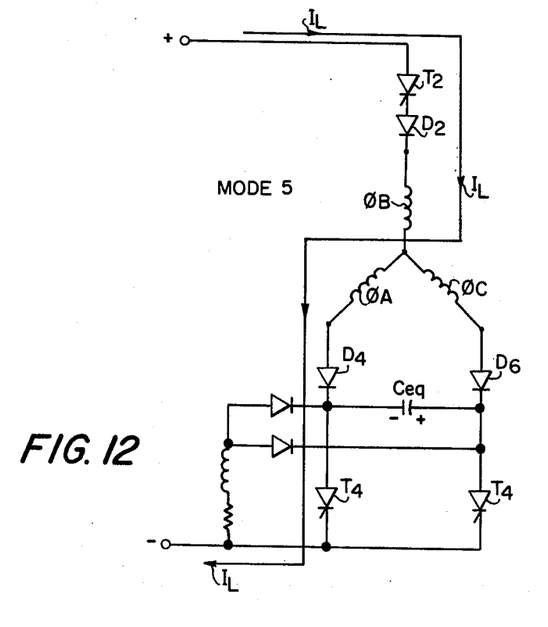

FIG. 9 illustrates the load current $I_L$ current flow for mode 2 operation immediately after the power thyristor T4 has been gated-on by a suitable gating signal applied to its gating electrode from the gating signal source (not shown). Upon turn-on of thyristor T4, thyristor T6 is commutated off due to the reverse polarity potential impressed across it from the equivalent capacitance $C_{eq}$ of the commutating capacitors C4, C5, and C6. The equivalent capacitance $C_{eq}$ is charged with the polarities indicated in FIG. 9. During this mode of operation, load current $I_L$ flows from the current source through $T_2$, $D_2$, phase $\phi_B$, phase $\phi_C$, diode $D_6$, equivalent capacitance $C_{eq}$, thyristor $T_4$ back to the current source. Concurrently, a reset current in the direction to help discharge capacitor $C_{eq}$ flows in the manner shown by the dotted line current arrow $I_r$ from $C_{eq}$ through $T_4$, $R_2$, $L_2$, $D_{10}$ back to $C_{eq}$. At the moment of reversal of polarity of charge on $C_{eq}$, due to the combined effects of the load current flow $I_L$ and reset current flow $I_r$, due to the discharge of energy stored in the inductive reactance $L_2$, reset current $I_r$ will transfer its path to the dotted line path shown in FIG. 10 (mode 3). In FIG. 10 it is seen that the reset current path $I_L$ is formed by $L_2$, coupling diode $D_{12}$, thyristor $T_4$, and resistor $R_2$. The energy stored in the inductor $L_2$ therefore is dissipated in resistor $R_2$ and does not add to the voltage produced across the equivalent capacitance $C_{eq}$. At the point in the operation when the voltage across equivalent capacitance $C_{eq}$ having the polarity shown in FIG. 10, equals the phase to phase voltage $V_{ac}$, load current flow $I_L$ will start through the phase A winding, diode $D_4$ and $T_4$ in the manner shown in FIG. 11 of the drawing. This is defined as the mode 4 operating condition and allows the phase A winding current to increase while the phase C winding decreases. Thereafter, conduction through diode $D_6$ will terminate and the load current $I_L$ will be shifted entirely to the phase A winding in the manner shown in FIG. 12 which depicts the mode 5 operation.

Sequential gating-on of the power thyristors T1 through T6 one after the other in a cyclical repeated manner as set forth in the following chart, will result in the supply of excitation current to the windings of motor load at the desired operating frequency (motor speed) with the magnitude of the excitation current being separately controlled by phase control rectifier 13.

Auto-Sequential Commutated Inverter
Thyristor Switching Chart

| Thyristor No. Gated On | Turns Off Thyristor No. | Load Current Path |
|---|---|---|
| $T_2$ | $T_1$ | $T_2$—$D_2$—$\phi_B$—$\phi_C$—$D_6$—$T_6$ —Current Source |
| $T_4$ | $T_6$ | $T_2$—$D_2$—$\phi_B$—$\phi_A$ —$D_4$—$T_4$—Current Source |
| $T_3$ | $T_2$ | $T_3$—$D_3$—$\phi_C$—$\phi_A$—$D_4$—$T_4$ —Current Source |
| $T_5$ | $T_4$ | $T_3$—$D_3$—$\phi_C$—$\phi_B$—$D_5$—$T_5$ —Current Source |
| $T_1$ | $T_3$ | $T_1$—$D_1$—$\phi_A$—$\phi_B$—$D_5$—$T_5$ —Current Source |
| $T_6$ | $T_5$ | $T_1$—$D_1\phi_A$—$\phi_C$—$D_6$—$T_6$ —Current Source |

From the above set forth chart, it will be appreciated that the turn-on of the next adjacent corresponding upper or lower thyristor in a branch sub-circuit will result in commutating off a previously conducting upper or lower thyristor of an adjacent branch sub-circuit and that by sequentially switching on and off the thyristors T1 through T6 in the manner depicted by the chart, rotating excitation of the phase windings $\phi_A$, $\phi_C$, and $\phi_B$ is achieved. The frequency at which the phase windings are excited will determine the frequency (speed of rotation) of the induction motor load. Hence by use of the reset circuit of this invention, higher rotating speeds are obtainable with smaller size power components in the auto-sequential commutated inverter than otherwise would be required with previously known circuits of the same general type.

Figure 13A:
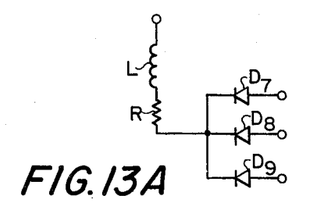
Figure 13B:
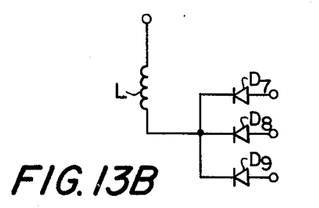
Figure 13C:
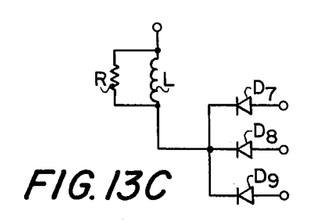
Figure 13D:
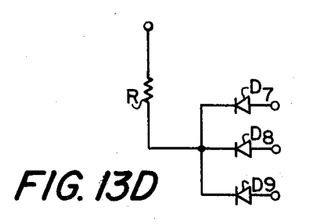
Figure 13E:
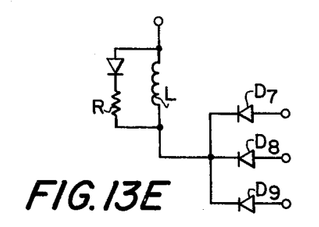
Figure 13F:
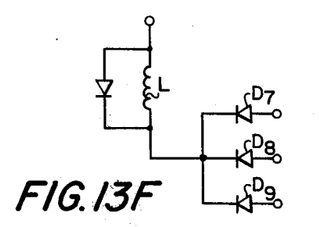
Figure 13G:
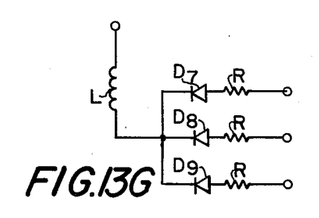
Figure 13H:
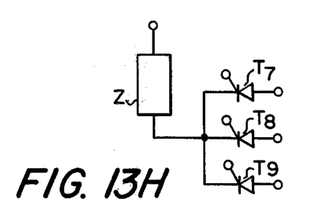

FIGS. 13A through 13H illustrate various different circuit designs for the reset circuit employed in the auto-sequential commutated controlled current inverter of the invention. FIG. 13A corresponds to the reset circuit as illustrated in FIG. 1 of the drawing. In FIG. 13B the discrete inductor L is designed in such a manner that it possesses sufficient resistance to act also as a dissipating resistor. In FIG. 13C, the dissipating resistor R is connected in paralled circuit relationship across the discrete inductor L. FIG. 13D illustrates an arrangement wherein a discrete resistor R comprises the common impedance which is employed to assist in discharging the energy stored in the equivalent capacitance of the commutating capacitors. FIG. 13E is in many respects similar to FIG. 13C but includes a diode in series with a dissipating resistor R and the series circuit thus comprised is connected in parallel across the discrete inductor L. In FIG. 13F, the resistance R is comprised by a diode which has designed into it sufficient losses to form a dissipating resistance. In the arrangement of FIG. 13G, the dissipating resistors R are each connected in series circuit relationship with the respective coupling diodes $D_7$, $D_8$, and $D_9$ etc. of the reset circuit. FIG. 13H depicts an arrangement wherein a generalized impedance Z has designed into it an amount of leakage inductance and resistance to provide a desired amount of inductive reactance and dissipating resistance, and further includes switching thyristors $T_7$, $T_8$, and $T_9$ in place of the corresponding coupling diodes $D_7$, $D_8$, and $D_9$ used in other species of the reset circuit. In all of these embodiments of the reset circuit, a common impedance to assist in the discharge of energy stored in the equivalent capacitance of the commutating capacitors, is provided. The common impedance preferably comprises a common inductive reactance for series resonating with the equivalent capacitance of the commutating capacitors at a frequency higher than the operating frequency so as to minimize the switching time required to complete switching of load current flow from one phase to another of a multi-phase load.

From the foregoing description it will be appreciated that the invention provides a new and improved auto-sequential commutated controlled current inverter having a new and improved reset circuit. The new and improved reset circuit operates to divert reset current flow away from the commutating capacitors of the auto-sequential commutated controlled current inverter in which it is used, thereby, avoiding the need to have these as well as the other power components of the inverter accommodate increased voltage stresses. Consequently, the inverter can be operated with lower voltage stresses and it can be made less expensively with power components having lower power ratings.

Having described several embodiments of a new and improved auto-sequential commutated controlled current inverter constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. In an auto-sequential commutated controlled current inverter for driving a multi-phase load from a source of controlled magnitude direct current, said auto-sequential commutated inverter comprising a plurality of parallel connected branch sub-circuits with each branch sub-circuit comprising at least one gate controlled power thyristor device connected in series circuit relationship with a respective power diode, each of the respective branch sub-circuits thus comprised being connected between a respective phase input to the multi-phase load and a common direct current power supply terminal for connection to the source of controlled magnitude direct current, and a respective commutating capacitor interconnected between the juncture of the power thyristor and the power diode of each respective branch sub-circuit and the juncture of the power thyristor and power diode of the next adjacent branch sub-circuit; the improvement comprising a reset circuit for improving the frequency characteristics of said auto-sequential commutated inverter with minimum size power components, said reset circuit comprising a common impedance for assisting in the discharge of energy stored in said commutating capacitors, said common impedance comprising a common inductive reactance including resistance for dissipating energy stored in the common inductive reactance and having one terminal connected to the common direct current power supply terminal, a plurality of coupling diodes, there being one coupling diode for each phase of the multi-phase load being supplied with each coupling diode having one terminal connected in common with the corresponding terminals of the remaining coupling diodes to the remaining terminal of the common impedance and the remaining terminals of each respective coupling diode being connected respectively to the juncture of the power thyristor and power diode of a respective branch sub-circuit.

2. In an auto-sequential commutated controlled current inverter for driving a multi-phase load from a source of controlled magnitude direct current, said auto-sequential commutated inverter comprising a plurality of parallel connected branch sub-circuits with each branch sub-circuit comprising at least one gate controlled power thyristor device connected in series circuit relationship with a respective power diode, each of the respective branch sub-circuits thus comprised being connected between a respective phase input to the multi-phase load and a common direct current power supply terminal for connection to the source of controlled magnitude direct current, and a respective commutating capacitor interconnected between the juncture of the power thyristor and the power diode of each respective branch sub-circuit and the juncture of the power thyristor and power diode of the next adjacent branch sub-circuit; the improvement comprising a reset circuit for improving the frequency characteristics of said auto-sequential commutated inverter with minimum size power components, said reset circuit comprising a common impedance for assisting in the discharge of energy stored in said commutating capacitors, said common impedance comprising a discrete inductor having an inductive reactance which series resonates with the equivalent capacitance of the commutating capacitors at a frequency higher than the operating frequency of the inverter and having one terminal connected to the common direct current power supply terminal, a plurality of coupling diodes, there being one coupling diode for each phase of the multi-phase load being supplied with each coupling diode having one terminal connected in common with the corresponding terminals of the remaining coupling diodes to the remaining terminal of the common impedance and the remaining terminals of each respective coupling diode being connected respectively to the juncture of the power thyristor and power diode of a respective branch sub-circuit.

3. An auto-sequential commutated inverter according to claim 2 further including a discrete resistor connected in circuit relationship with the common discrete inductor intermediate the common direct power supply terminal and the commonly connected terminals of the respective coupling diodes.

4. An auto-sequential commutated inverter according to claim 3 wherein the discrete resistor is connected in series circuit relationship with the discrete inductor.

5. An auto-sequential commutated inverter according to claim 3 wherein the discrete resistor is connected in parallel circuit relationship with the discrete inductor.

6. An auto-sequential commutated inverter according to claim 5 further including a diode connected in series circuit relationship with the discrete resistor and with the series circuit thus formed connected in parallel circuit relationship across the discrete inductor.

7. An auto-sequential commutated inverter according to claim 2 further including a diode connected in parallel circuit relationship across the discrete inductor.

8. An auto-sequential commutated inverter according to claim 2 further including a discrete resistor connected in series circuit relationship with each respective coupling diode.

9. In an auto-sequential commutated controlled current inverter for driving a multi-phase load from a source of controlled magnitude direct current, said auto-sequential commutated inverter comprising a plurality of parallel connected branch sub-circuits with each branch sub-circuit comprising at least one gate controlled power thyristor device connected in series relationship with a respective power diode, each of the respective branch sub-circuits thus comprised being connected between a respective phase input to the multi-phase load and a common direct current power supply terminal for connection to the source of controlled magnitude direct current, and a respective commutating capacitor interconnected between the juncture of the power thyristor and the power diode of each respective branch sub-circuit and the juncture of the power thyristor and power diode of the next adjacent branch sub-circuit; the improvement comprising a reset circuit for improving the frequency characteristics of said auto-sequential commutated inverter with minimum size power components, said reset circuit comprising a common impedance for assisting in the discharge of energy stored in said commutating capacitors, said common impedance being comprised by a discrete resistor and having one terminal connected to the common direct current power supply terminal, a plurality of coupling diodes, there being one coupling diode for each phase of the multi-phase load being supplied with each coupling diode having one terminal connected in common with the corresponding terminals of the remaining coupling diodes to the remaining terminal of the common impedance and the remaining terminals of each respective coupling diode being connected respectively to the juncture of the power thyristor and power diode of a respective branch sub-circuit.

10. In an auto-sequential commutated controlled current inverter for driving a multi-phase load from a source of controlled magnitude direct current, said auto-sequential commutated inverter comprising a plurality of parallel connected branch sub-circuits with each branch sub-circuit comprising at least one gate controlled power thyristor device connected in series circuit relationship with a respective power diode, each of the respective branch sub-circuits thus comprised being connected between a respective phase input to the multi-phase load and a common direct current power supply terminal for connection to the source of controlled magnitude direct current, and a respective commutating capacitor interconnected between the juncture of the power thyristor and the power diode of each respective branch sub-circuit and the juncture of the power thyristor and power diode of the next adjacent branch sub-circuit; the improvement comprising a reset circuit for improving the frequency characteristics of said auto-sequential commutated inverter with minimum size power components, said reset circuit comprising a common impedance for assisting in the discharge of energy stored in said commutating capacitors, said common impedance having one terminal connected to the common direct current power supply terminal, a plurality of coupling gate controlled thyristor devices, there being one coupling thyristor for each phase of the multi-phase loading being supplied with each coupling thyristor having one terminal connected in common with the corresponding terminals of the remaining coupling thyristors to the remaining terminal of the common impedance and the remaining terminals of each respective coupling thyristor being connected respectively to the juncture of the power thyristor and power diode of a respective branch sub-circuit.

11. An auto-sequential commutated inverter according to claim 1 wherein the multi-phase load being supplied comprises the phase windings of a multi-phase alternating current motor of the assynchronous or synchronous type.

12. In an auto-sequential commutated controlled current inverter for driving a multi-phase load from a source of controlled magnitude direct current, said auto-sequential commutated inverter comprising a plurality of parallel connected branch sub-circuits connected across a pair of supply terminals that in turn are adapted to be connected across a source of controlled magnitude direct current, there being a respective branch sub-circuit for each phase of the multi-phase load being supplied, each branch sub-circuit comprising a first gate controlled power thyristor, a first power diode, a second power diode and a second gate controlled power thyristor connected in the order named in series circuit current aiding relationship respective load terminal means for connection to each phase of a multi-phase load being supplied, each load terminal means being connected to the juncture of the first and second power diodes of a respective branch sub-circuit, a respective commutating capacitor interconnected between the juncture of the first power thyristor with the first power diode of each respective branch sub-circuit and the junction of the first power thyristor with the first power diode of the next adjacent branch sub-circuit, and a respective commutating capacitor interconnected between the juncture of the second power thyristor with the second power diode of each respective branch sub-circuit and the juncture of the second power thyristor with the second power diode of the next adjacent branch sub-circuit; the improvement comprising first and second reset circuits interconnected with the first and second power thyristors and power diodes, respectively, of all of the branch sub-circuits for improving the frequency response characteristics of the auto-sequential commutated inverter with minimum size power components, each of said first and second reset circuits comprising a common impedance for assisting in the discharge of energy stored in the equivalent capacitance of respective commutating capacitors to which it is connected, the common impedance of each respective reset circuit comprising a common inductive reactance and resistance for dissipating energy stored in the common inductive reactance and having one terminal connected to a respective direct current power supply terminal, each reset circuit further comprising a plurality of coupling diodes, there being a respective coupling diode for each phase of a multi-phase load being supplied with each coupling diode having one terminal connected in common with the corresponding terminals of the remaining coupling diodes for a respective reset circuit, the commonly connected terminals of the coupling diodes being connected in common to the remaining terminal of the common impedance for that respective reset circuit, and the remaining terminal of each respective coupling diode being connected respectively to the juncture of the respective first or second power thyristor of each branch sub-circuit with its associated respective power diode.

13. An auto-sequential commutated inverter according to claim 12 wherein the common inductive reactance in each reset circuit comprises a discrete inductor having an inductive reactance which series resonates with the equivalent capacitance of the associated commutating capacitors at a frequency higher than the operating frequency of the inverter.

14. An auto-sequential commutated inverter according to claim 12 wherein the multi-phase load being supplied comprises the phase windings of a multi-phase alternating current motor of the assynchronous or synchronous type.

15. An auto-sequential commutated inverter according to claim 13 further including a discrete resistor connected in circuit relationship with the common discrete inductor of each reset circuit intermediate the common direct power supply terminal and the commonly connected terminals of the respective associated coupling diodes.

16. An auto-sequential commutated inverter according to claim 15 wherein the discrete resistor is connected in series circuit relationship with the discrete inductor.

17. An auto-sequential commutated inverter according to claim 15 wherein the discrete resistor is connected in parallel circuit relationship with the discrete inductor.

18. An auto-sequential commutated inverter according to claim 17 further including a diode connected in series circuit relationship with the discrete resistor and with the series circuit thus formed connected in parallel circuit relationship across the discrete inductor.

19. An auto-sequential commutated inverter according to claim 13 further including a diode connected in parallel circuit relationship across the discrete inductor.

20. An auto-sequential commutated inverter according to claim 13 further including a discrete resistor connected in series circuit relationship with each respective coupling diode.

21. In an auto-sequential commutated controlled current inverter for driving a multi-phase load from a source of controlled magnitude direct current, said auto-sequential commutated inverter comprising a plurality of parallel connected branch sub-circuits connected across a pair of supply terminals that in turn are adapted to be connected across a source of controlled magnitude direct current, there being a respective branch sub-circuit for each phase of the multi-phase load being supplied, each branch sub-circuit comprising a first gate controlled power thyristor, a first power diode, a second power diode and a second gate controlled power thyristor connected in the order named in series circuit current aiding relationship, respective load terminal means for connection to each phase of a multi-phase load being supplied, each load terminal means being connected to the juncture of the first and second power diodes of a respective branch sub-circuit, a respective commutating capacitor interconnected between the juncture of the first power thyristor with the first power diode of each respective branch sub-circuit and the juncture of the first power thyristor with the first power diode of the next adjacent branch sub-circuit, and a respective commutating capacitor interconnected between the juncture of the second power thyristor with the second power diode of each respective branch sub-circuit and the juncture of the second power thyristor with the second power diode of the next adjacent branch sub-circuit; the improvement comprising first and second reset circuits interconnected with the first and second power thyristors and power diodes, respectively, of all of the branch sub-circuits for improving the frequency response characteristics of the auto-sequential commutated inverter with minimum size power components, each of said first and second reset circuits comprising a common impedance for assisting in the discharge of energy stored in the equivalent capacitance of respective commutating capacitors to which it is connected, the common impedance in each reset circuit being comprised by a discrete resistor and having one terminal connected to a respective direct current power supply terminal, each reset circuit further comprising a plurality of coupling diode, there being a respective coupling diode for each phase of a multi-phase load being supplied, with each coupling diode having one terminal connected in common with the corresponding terminals of the remaining coupling diodes for a respective reset circuit, the commonly connected terminals of the coupling diodes being connected in common to the remaining terminal of the common impedance for that respective reset circuit, and the remaining terminal of each respective coupling diode being connected respectively to the juncture of the respective first or second power thyristor of each branch sub-circuit with its associated respective power diode.

22. In an auto-sequential commutated controlled current inverter for driving a multi-phase load from a source of controlled magnitude direct current, said auto-sequential commutated inverter comprising a plurality of parallel connected branch sub-circuits connected across a pair of supply terminals that in turn are adapted to be connected across a source of controlled magnitude direct current, there being a respective branch sub-circuit for each phase of the multi-phase load being supplied, each branch sub-circuit comprising a first gate controlled power thyristor, a first power diode, a second power diode and a second gate controlled power thyristor connected in the order named in series circuit current aiding relationship, respective load terminal means for connection to each phase of a multi-phase load being supplied, each load terminal means being connected to the juncture of the first and second power diodes of a respective branch sub-circuit, a respective commutating capacitor interconnected between the juncture of the first power thyristor with the first power diode of each respective branch sub-circuit and the juncture of the first power thyristor with the first power diode of the next adjacent branch sub-circuit, and a respective commutating capacitor interconnected between the juncture of the second power thyristor with the second power diode of each respective branch sub-circuit and the juncture of the second power thyristor with the second power diode of the next adjacent branch sub-circuit; the improvement comprising first and second reset circuits interconnected with the first and second power thyristors and power diodes, respectively, of all of the branch sub-circuits for improving the frequency response characteristics of the auto-sequential commutated inverter with minimum size power components, each of said first and second reset circuits comprising a common impedance for assisting in the discharge of energy stored in the equivalent capacitance of respective commutating capacitors to which it is connected, the common impedance of each respective reset circuit having one terminal connected to a respective direct current power supply terminal, each reset circuit further comprising a plurality of coupling gate controlled thyristor devices, there being a respective coupling thyristor for each phase of a multi-phase load being supplied, with each coupling thyristor having one terminal connected in common with the corresponding terminals of the remaining coupling thyristors for a respective reset circuit, the commonly connected terminals of the coupling thyristors being connected in common to the remaining terminal of the common impedance for that respective reset circuit, and the remaining terminal of each respective coupling thyristor being connected respectively to the juncture of the respective first or second power thyristor of each branch sub-circuit with its associated respective power diode.

* * * * *